United States Patent
Ahmed et al.

(10) Patent No.: US 8,291,081 B2
(45) Date of Patent: *Oct. 16, 2012

(54) META-DATA BASED METHOD FOR LOCAL CACHE UTILIZATION

(75) Inventors: Salmaan Syed Ahmed, Mississauga (CA); Ajit Singh, Waterloo (CA)

(73) Assignee: Slipstream Data Inc., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,157

(22) Filed: Jul. 19, 2011

(65) Prior Publication Data

US 2012/0016931 A1   Jan. 19, 2012

Related U.S. Application Data

(63) Continuation of application No. 11/017,931, filed on Dec. 22, 2004, now Pat. No. 8,010,670.

(60) Provisional application No. 60/531,615, filed on Dec. 23, 2003.

(51) Int. Cl.
*G06F 15/173* (2006.01)
*G06F 15/177* (2006.01)

(52) U.S. Cl. ......... 709/226; 709/223; 709/225; 709/217

(58) Field of Classification Search .................. 709/226, 709/223, 225, 217
See application file for complete search history.

(56) References Cited

U.S. PATENT DOCUMENTS

| | | | |
|---|---|---|---|
| 5,931,904 A * | 8/1999 | Banga et al. ................. | 709/217 |
| 6,085,193 A | 7/2000 | Malkin et al. | |
| 6,178,461 B1 * | 1/2001 | Chan et al. ..................... | 709/247 |
| 6,240,447 B1 | 5/2001 | Banga et al. | |
| 6,510,458 B1 * | 1/2003 | Berstis et al. ................. | 709/219 |
| 6,553,409 B1 * | 4/2003 | Zhang et al. ................... | 709/213 |
| 6,658,462 B1 | 12/2003 | Dutta | |
| 6,675,214 B2 * | 1/2004 | Stewart et al. ................ | 709/226 |
| 6,751,608 B1 | 6/2004 | Cohen et al. | |
| 6,772,203 B1 * | 8/2004 | Feiertag et al. ............... | 709/219 |
| 6,826,626 B1 * | 11/2004 | McManus ...................... | 709/246 |
| 6,883,068 B2 * | 4/2005 | Tsirigotis et al. .............. | 711/133 |
| 6,907,501 B2 | 6/2005 | Tariq et al. | |
| 7,055,169 B2 * | 5/2006 | Delpuch et al. ............... | 725/100 |
| 7,139,811 B2 | 11/2006 | Lev Ran et al. | |
| 7,191,290 B1 | 3/2007 | Ackaouy et al. | |
| 7,269,784 B1 * | 9/2007 | Kasriel et al. ................. | 715/205 |

(Continued)

OTHER PUBLICATIONS

Liao et al. "Architecture of Proxy Partial Caching using HTTp for supporting interactive video and cache consistency", Oct. 14, 2002.

(Continued)

*Primary Examiner* — Karen Tang
(74) *Attorney, Agent, or Firm* — Bereskin & Parr LLP/S.E.N.C.R.L., s.r.l.

(57) ABSTRACT

A system and method for caching data and verifying cached data using a client-server model and meta-data. In particular, a client proxy and a server proxy are in communication with each other and with the client and the server, respectively; client proxy meta-data and server proxy meta-data related to the data cached by the client proxy and server proxy, respectively, are calculated and communicated between the client proxy and the server proxy; and the client proxy meta-data and the server proxy meta-data are compared to determine a cache hit or miss.

9 Claims, 6 Drawing Sheets

U.S. PATENT DOCUMENTS

| | | | | |
|---|---|---|---|---|
| 7,296,051 | B1* | 11/2007 | Kasriel | 709/203 |
| 7,305,473 | B2* | 12/2007 | Vogt | 709/227 |
| 7,334,023 | B2* | 2/2008 | Koba et al. | 709/213 |
| 7,349,929 | B2* | 3/2008 | Pfitzner | 1/1 |
| 7,480,731 | B2* | 1/2009 | Seki et al. | 709/232 |
| 7,487,261 | B1* | 2/2009 | Kasriel | 709/246 |
| 7,849,134 | B2* | 12/2010 | McCanne et al. | 709/203 |
| 7,864,186 | B2* | 1/2011 | Robotham et al. | 345/581 |
| 7,962,594 | B2* | 6/2011 | Kasriel et al. | 709/223 |
| 2002/0026511 | A1 | 2/2002 | Garcia-Luna-Aceves et al. | |
| 2002/0055966 | A1 | 5/2002 | Border et al. | |
| 2003/0115420 | A1* | 6/2003 | Tsirigotis et al. | 711/133 |
| 2003/0149737 | A1* | 8/2003 | Lambert et al. | 709/214 |
| 2003/0188009 | A1* | 10/2003 | Agarwalla et al. | 709/236 |
| 2003/0191812 | A1* | 10/2003 | Agarwalla et al. | 709/217 |
| 2005/0044242 | A1 | 2/2005 | Stevens et al. | |
| 2006/0059223 | A1 | 3/2006 | Klemets et al. | |
| 2006/0190607 | A1 | 8/2006 | Lowery et al. | |
| 2006/0224752 | A1 | 10/2006 | Parekh | |
| 2010/0241810 | A1 | 9/2010 | Lowery et al. | |
| 2011/0320510 | A1* | 12/2011 | O'Connell et al. | 707/827 |

OTHER PUBLICATIONS

R. Fielding et al. "Request for Comments:2616, Hypertext Transfer Protocol—HTTP/1.1", Network Working Group, Jun. 1999.

* cited by examiner

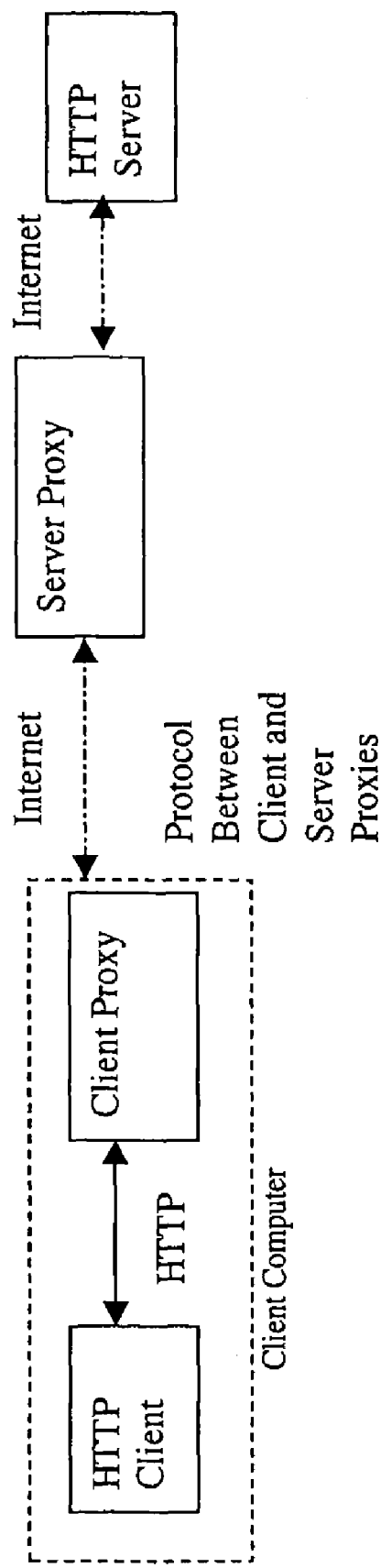
Figure 1: Software Architecture for MDBC Method

META-DATA BASED METHOD FOR LOCAL CACHE UTILIZATION

CROSS-REFERENCE TO RELATED APPLICATIONS

This application is a continuation of U.S. patent application Ser. No. 11/017,931, filed on Dec. 22, 2004, which claims priority from U.S. Provisional Patent Application Ser. No. 60/531,615, filed on Dec. 23, 2003. The entire contents of both of these applications is hereby incorporated by reference.

FIELD OF THE INVENTION

The present invention relates to a method (named Meta-Data Based Caching, or MDBC) of caching data locally by a client while using HTTP protocol for downloading data from a server in order to reduce the volume of data communication and also possibly reduce the data transmission time.

BACKGROUND OF THE INVENTION

At present, large volumes of data are delivered over the Internet network to client computing devices such as desktop and laptop computers and various handheld digital devices using a communication protocol called, the Hyper Text Transfer Protocol (HTTP). The HTTP protocol can be visualized as a protocol for interaction between a HTTP client (or simply called client in this document) that sends requests for data, and a HTTP server (or simply called server in this document) that supplies the data. The client, after sending the request, waits for the server's response, and then normally, upon receipt of data, delivers the data to the end user. In many cases, the client is implemented by a software component called a web-browser. The server is usually implemented by a software component called a web-server. However, it is possible to use HTTP protocol by other types of software components to create a HTTP client or a HTTP server for exchange of data over the Internet. The client uses a text string called a Uniform Resource Locator (URL) to identify the data being requested by the client.

Since it is often the case that the data corresponding to a specific URL remains constant for some period of time, the HTTP protocol provides a mechanism for making use of the data previously accessed from the server which may be cached locally by a client. Such methods are described in R. Fielding, J. Gettys, J. Mogul, H Frystyk, L. Masinter, P. Leach, and T. Berners-Lee, "Request for Comments: 2616, Hypertext Transfer Protocol—HTTP/1.1," Network Working Group, June 1999 ("Fielding"), which is hereby incorporated by reference herein.

Generally, the primary benefits of caching data by the client are reduction in the volume of data transmitted by the server to the client, and reduction in the time required for accessing the data by the client. When a client locally stores or caches a copy of the data corresponding to a URL, the next time the same client requests the data for the same URL, the client's copy of the data corresponding to the URL is considered to be "fresh" or "stale" depending on whether the client's cached copy still contains the valid data or not. If the client's cache does contain a valid copy of the requested data, the client's copy is considered to be "fresh". On the other hand, if the client's cached copy no longer contains valid data corresponding to the URL, the client's copy is considered to be "stale. The HTTP protocol outlined in Fielding essentially relies on one of two metrics to determine if the copy of the content cached at the client is "stale" or "fresh":

A. The protocol can rely on the server that supplies data (called origin-server) to explicitly provide the expiration time and/or date for the data.

B. The client uses heuristics based on metrics specified by the HTTP protocol (such as the Last-Modified time) to estimate a plausible expiration time/date.

In Method A, the origin-server provides an explicit expiration time/date for the data corresponding to the URL. The client's caching mechanism maintains a database that maps each named data to its respective expiration time/date. Thus, each time the data is requested, the client's caching mechanism checks the database to see if the data is in the local cache of the client and if the expiration time/date has passed. If the expiration time/date has not passed then the request is fulfilled directly from the local cache and the origin server is not consulted. This technique or method is known as the "expiration" method of cache control.

Method B differs from Method A in that the origin-server does not explicitly specify an expiration time/date for each object, rather the caching mechanism associated with the client uses its own internal metrics to approximate an expiration date and time.

Method A is the preferred caching method, and also the more accurate of the two, but it is generally only effective as long as the server's expiration times are carefully chosen. Unfortunately, for a large and complex server with dynamic data, it is almost impossible to know a priori how much time will pass before a specific data will semantically change.

While Method B does not impose any requirements on server's administrators, it is not possible for this method to be perfectly accurate and, as a result, it may compromise semantic transparency.

In general, caching, as described in Fielding has two specific methods for reducing the volume of data transmission during the interaction between a client and a server:

I. Eliminate the need to send full requests, using an "expiration" mechanism ("Expiration Time Method").

II. Eliminate the need to send full responses, using a "validation" mechanism based on last-modified time ("Last-Modified Time Method").

As described earlier, Method I relies on the origin-server to supply an explicit expiration time/date for the data. According to this method, if the requested data is found in the local cache of the client, and it has not expired, the client need not send the request to the server.

On the other hand, for using the Method II, the origin-server need not provide an expiration date for the data. With Method II, the client's caching mechanism checks its database for a cached version of the requested data. If a cached version is found, then a request is sent to the origin-server to send the data if and only if the requested content has been modified since the time the client cached the data. If the content has not been modified, then the server only sends a response header and thereby instructs the client to use the cached copy. However, if the data has been modified since the last access, the server sends the new data.

Neither of Method I or Method II deals with a situation in which the data has been specified as not being suitable for caching by the server (or administrator thereof). In some situations, it may be simpler or more beneficial for a server to identify all data as not being suitable for caching so that there is no need to calculate/estimate an expiration time/date or other reason. As such, there is a need for a way to allow caching of many types of data, including that which is ordinarily indicated as "no cache".

SUMMARY OF THE INVENTION

The system and method of the invention builds upon and is intended to improve upon the existing methods described above by providing additional methods for ascertaining the validity of cached data between a client and server, and thus reduce the volume of data transmission requirements. The method is based on utilizing computed characteristics, called meta-data, associated with the response data for a particular URL.

According to one embodiment of the invention, there is provided a system for caching data using a client-server model. The system includes: a) a client proxy and a server proxy in communication with each other and with the client and the server, respectively; b) a plurality of processors for calculating client proxy meta-data and server proxy meta-data related to the data cached by the client proxy and server proxy, respectively; and, c) a communication link for communicating said meta-data between the client proxy and the server proxy. At least one processor from the plurality of processors is further configured to compare the client proxy meta-data and the server proxy meta-data to determine a cache hit or miss.

According to another embodiment of the invention, there is provided a method for optimizing the transmission of data from a server to a client said method comprising the steps of: a) upon a client request for data to a client proxy, determining if a prior version of said data exists in a client proxy cache, if so forwarding a request containing client proxy meta-data describing said prior version of said data to a server proxy; b) if at step a) said prior version of said data does not exist in said client proxy cache, sending a request for said data to said server proxy; c) upon receipt of a request from step a) said server proxy determining if said prior version of said data is current based on comparing said client proxy meta-data with server proxy meta-data describing the data requested, if said prior version of said data is current, informing said client proxy of this, if not then fetching the current data from the said server, returning current data and updating server proxy meta-data; d) upon receipt of a request from step b) fetching current data from said server, updating server proxy meta-data, and sending said current data to said client proxy; e) updating said client proxy meta-data when said client proxy receives current data from said server proxy; and f) forwarding said prior version of said data or said current data from said client proxy to said client.

According to yet another embodiment of the invention, there is provided a method for ascertaining the validity of cached data on a HTTP client for a given URL using meta-data derived from response data previously fetched from the HTTP server for the same URL.

BRIEF DESCRIPTION OF THE DRAWINGS

FIG. 1 shows the general structure of a meta-data based system for local cache utilization according to an embodiment of the invention.

DETAILED DESCRIPTION OF THE INVENTION

Figure 2A:
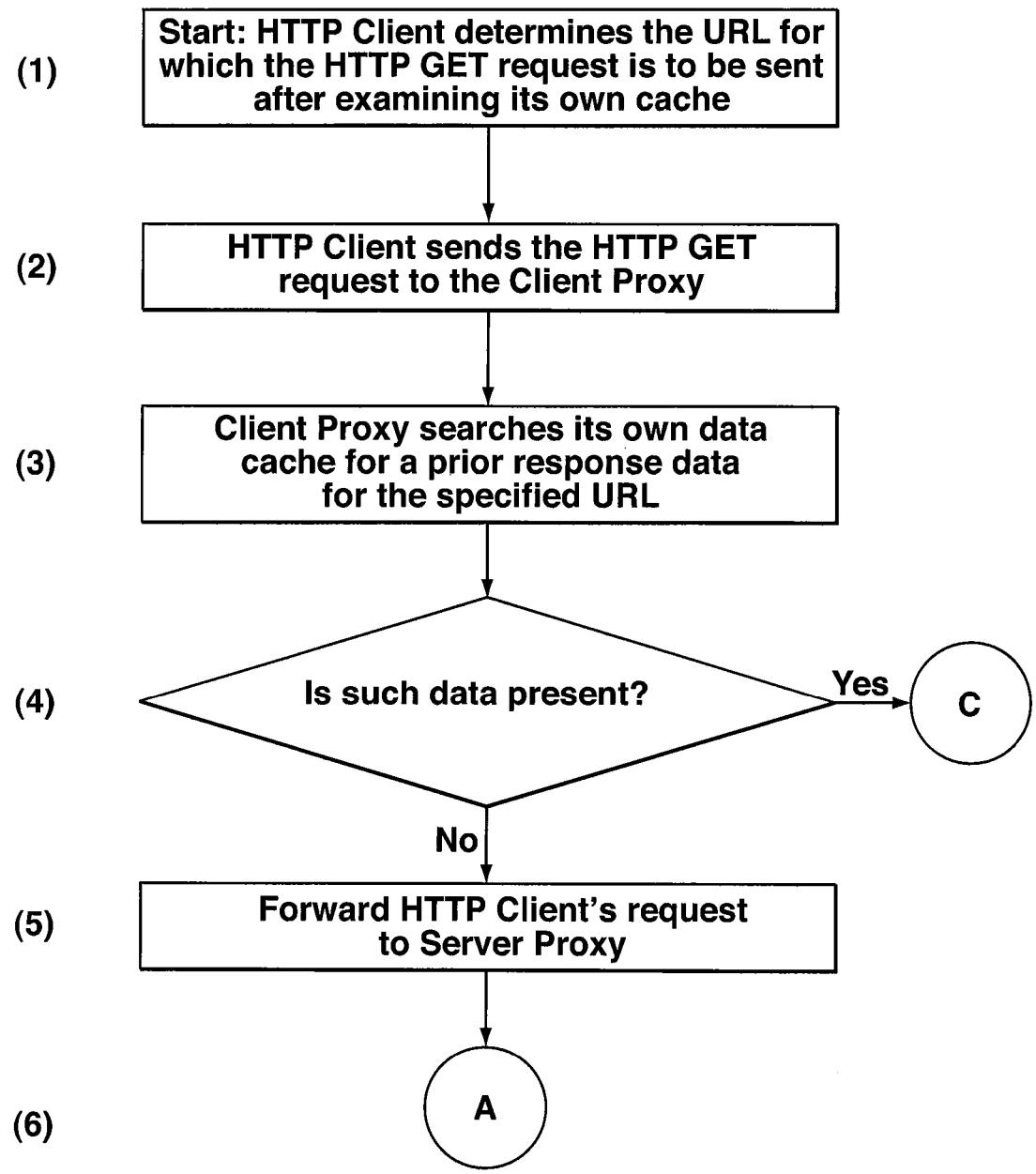
FIG. 2 shows a flowchart of the operation of a meta-data based method for local cache utilization according to an embodiment of the invention.
Figure 2B:
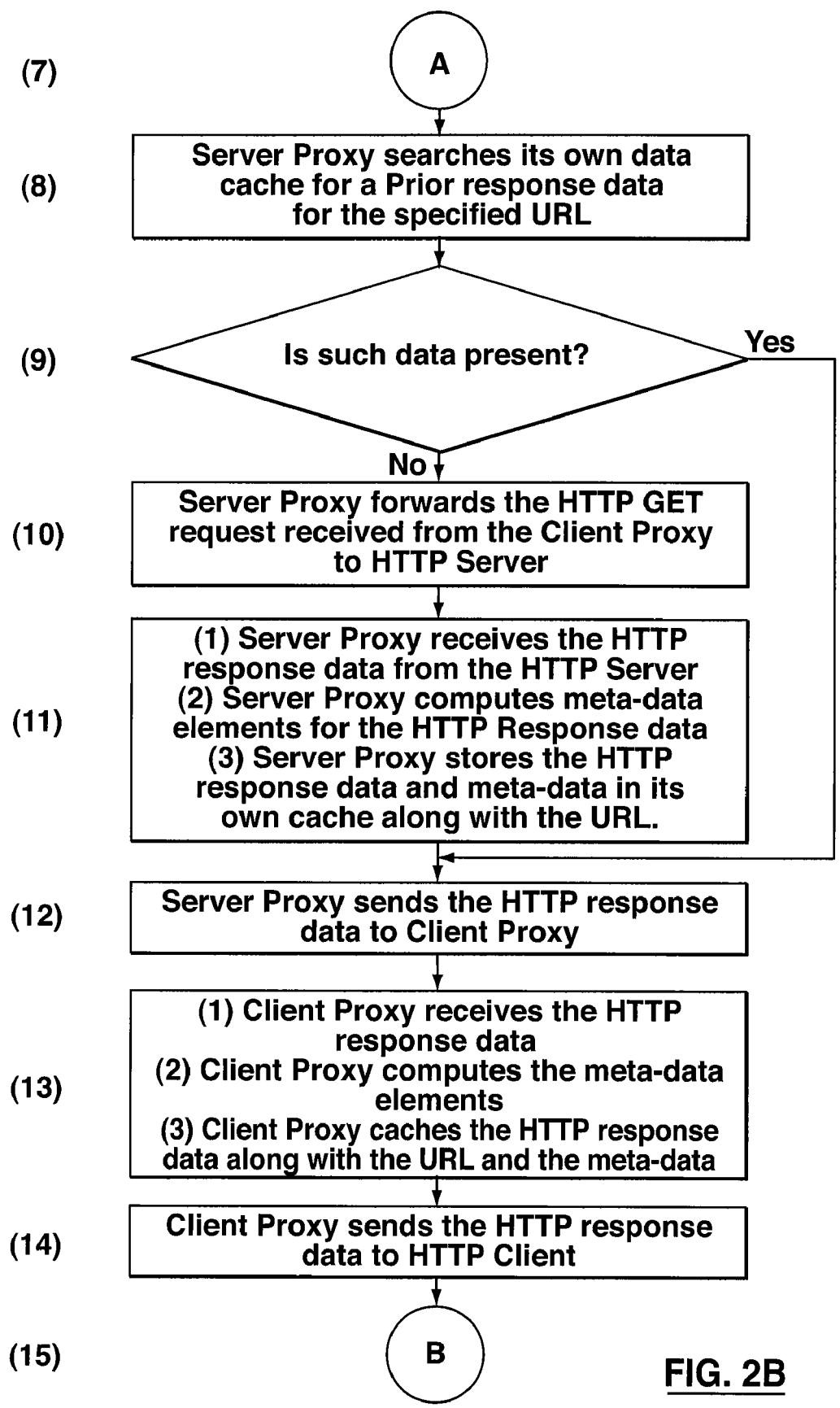
Figure 2C:
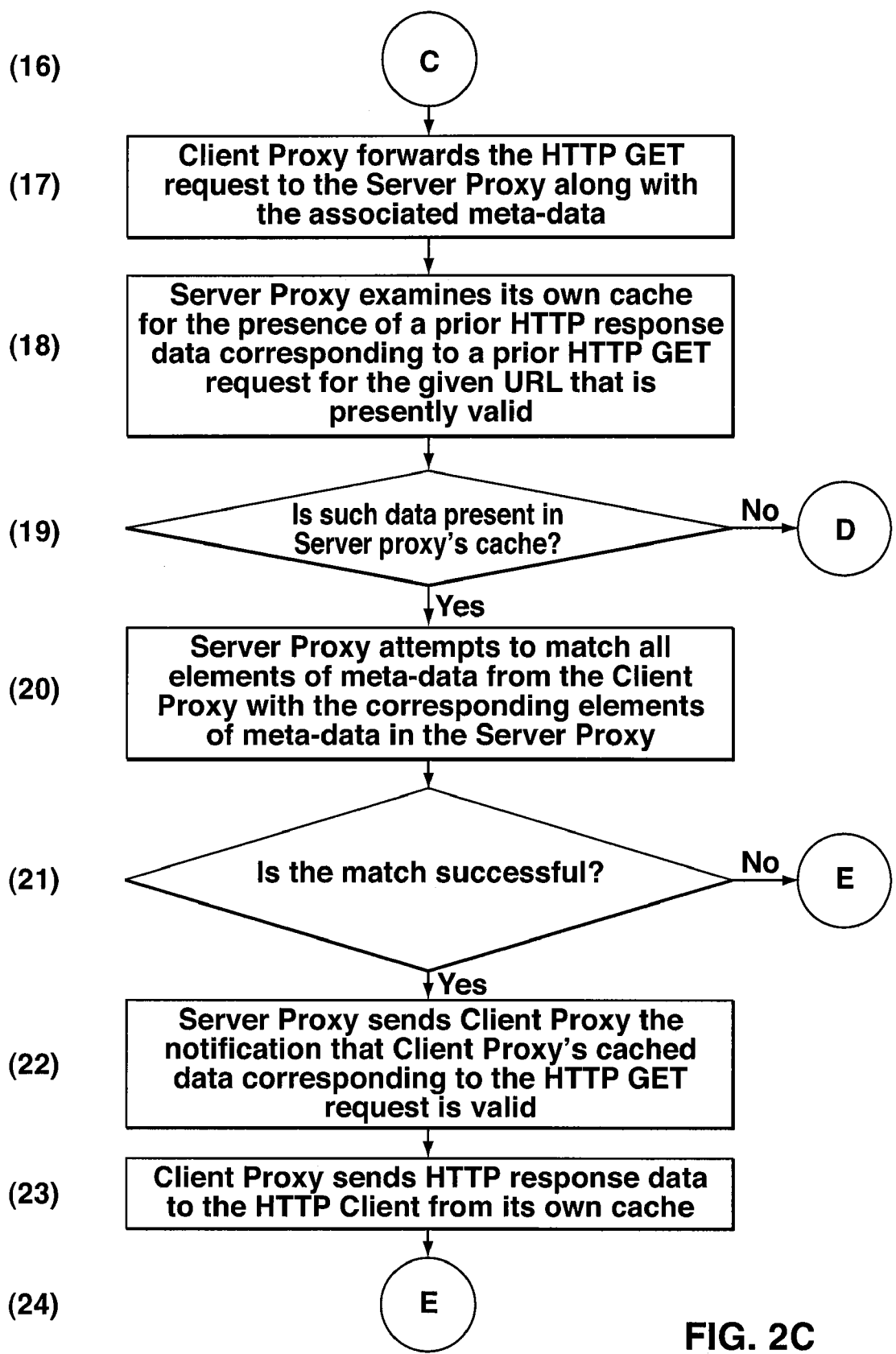
Figure 2D:
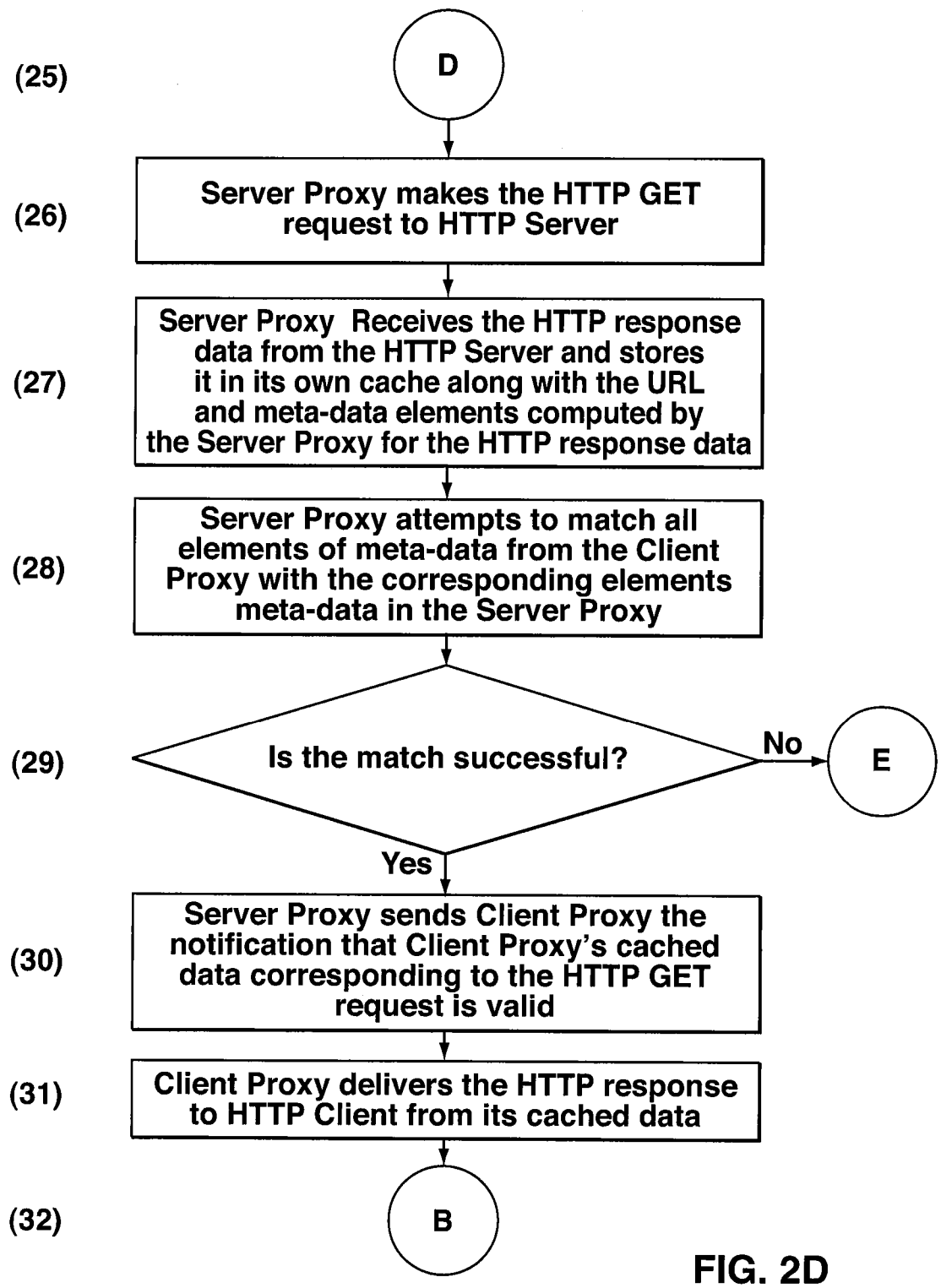
Figure 2E:
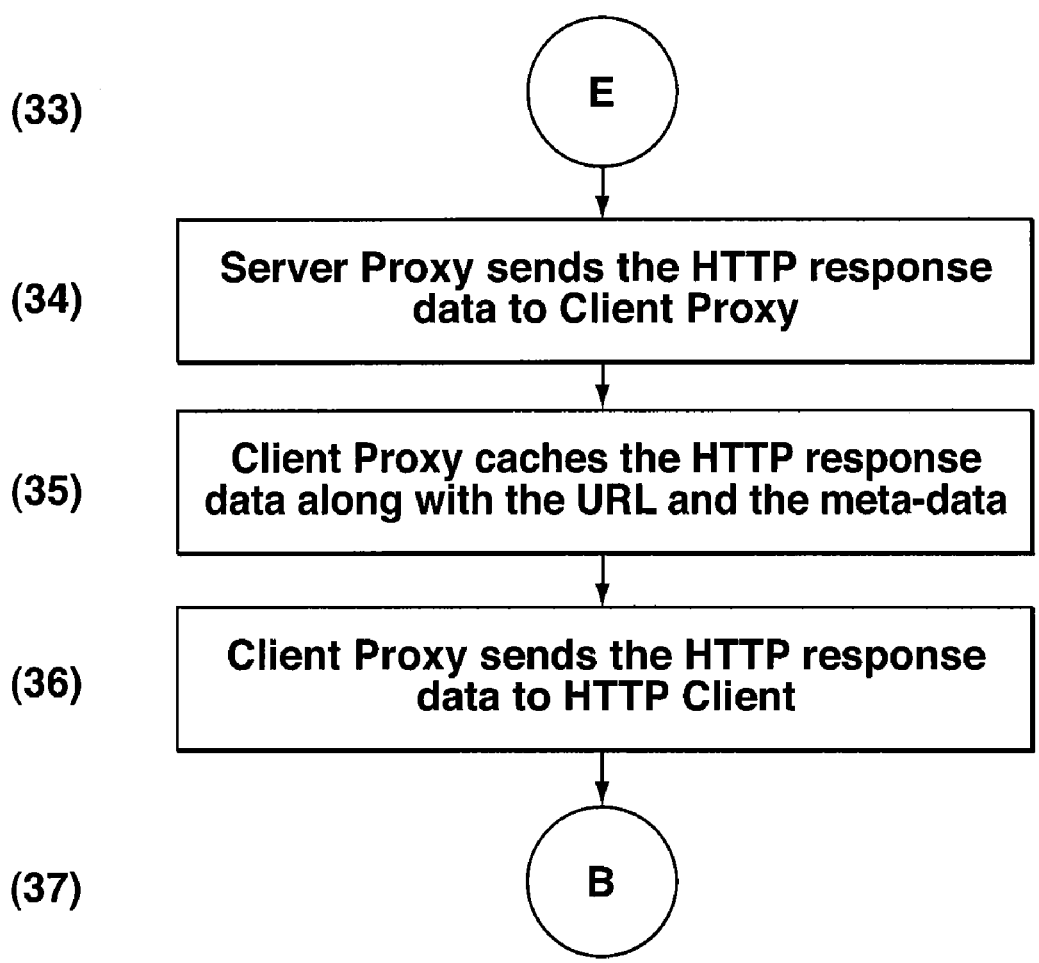
Figure 2F:
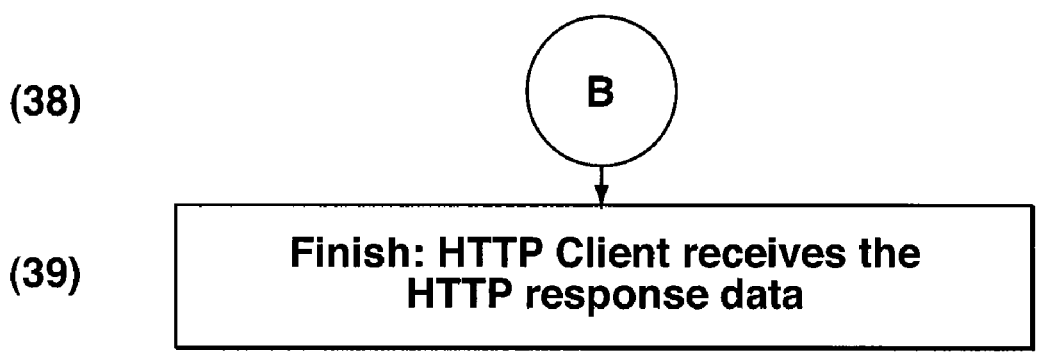

The software architecture for the MDBC method of interaction between a HTTP client and HTTP server is shown in FIG. 1.

In FIG. 1, the client computer is connected to the Internet using any type of link low or high bandwidth). HTTP Client in FIG. 1 represents any HTTP client that requests data from a server using the HTTP protocol. HTTP Server component in FIG. 1 represents any HTTP server that supplies data to requesting clients. HTTP Client on the client computer does not directly interact with HTTP Server. Rather, two intermediate software components are used—one on the client side, and the other on the server side. The client side component is called Client Proxy. The server side component is called Server Proxy. A Server Proxy can concurrently interact with (or serve) more than one Client Proxy components located on different client computers. Instead of sending its HTTP request for data directly to HTTP Server, HTTP Client sends the data to Client Proxy. Client Proxy, as described later, may modify the original request from HTTP Client and then sends the request to Server Proxy. Depending upon the situation, as described later, Server Proxy first attempts to respond to Client Proxy's request using its own cached data, failing which it may send the request to HTTP Server. Similarly, an HTTP response from HTTP Server is communicated through the Server Proxy and then to Client Proxy, before being delivered to HTTP Client. Optionally, all the data that is communicated between Client Proxy and Server Proxy can be optimized using a customized protocol between Client Proxy and Server Proxy by using optimization techniques, including but not limited to, data compression techniques.

Based on the software architecture shown in FIG. 1, the caching techniques outlined in Fielding are improved using the algorithm described as follows:

Prior to sending a HTTP request for data, HTTP Client may optionally search its own cache and then determine if a valid copy of the required data is present in its own cache or whether a HTTP request for a given URL needs to be sent.

Next, for each data being requested, HTTP Client sends Client Proxy a request of the following form:

GET <URL> PROTOCOL VERSION

For instance:

GET http://www.w3.org/HTTP/1.1

Both Client Proxy and Server Proxy maintain their respective databases that hold, for a certain period of time, additional information about each HTTP response data corresponding to a URL that has previously been received along with the actual response data. This additional information is called meta-data associated with the response data. This meta-data includes, but is not limited to, the URL associated with the response data, (more generally, the meta-data can be indexed or keyed to the requested URL) the type of data in the response data (for example, a text file, or a GIF image file), the length of the response data, a hash value associated with the response data. The hash value could be computed using CRC-16, CRC-32, SHA1, MD2, MD4, MD5, or any other suitable algorithm. By design, Client Proxy and Server Proxy are coordinated with respect to the meta-data elements used in a particular implementation of MDBC method and algorithms used for computing each such meta-data element.

In a case in which no prior response data is found in Client Proxy cache for the given URL, the Client Proxy simply forwards HTTP Client's request to Server Proxy. Server Proxy first searches its own data cache for the response data for the URL specified by the Client Proxy that is currently valid based on either Expiration Time Method or the Last-Modified Time Method. If such data is found, Server Proxy returns the response data to the Client Proxy. Otherwise, Server Proxy interacts as a regular HTTP client with HTTP Server as described in Fielding and receives the response data from the HTTP Server. Server Proxy sends the response data to Client Proxy. In either case, the Client Proxy, in turn, sends the response data to HTTP Client. Both Client Proxy and Server Proxy cache the response data along with the meta-data in their respective databases for their future use.

In a case in which, a prior response corresponding to the requested URL is found in Client Proxy's cache, Client Proxy, as part of a modified request, forwards to Server Proxy elements of the meta-data associated with the prior response data for that specific URL.

Server Proxy, upon receiving the request from the Client Proxy, first attempts to fulfill the request from the Client Proxy by examining its own cache. If a prior response data for the particular URL is found in Server Proxy's cache, which is still valid based on either the Expiration Time Method or the Last-Modified Time Method, then Server Proxy retrieves the meta-data for the response data from its cache and compares each element of the newly computed meta-data with the corresponding values of meta-data supplied by Client Proxy. If the values for all the corresponding elements of meta-data match, then the Server Proxy informs the Client Proxy to deliver to HTTP Client the response data that is stored in the Client Proxy's cache. The actual response body is not transmitted from the Server Proxy to Client Proxy. Client Proxy delivers the HTTP response data from the Client Proxy's cache to the HTTP client.

If, on the other hand, Server Proxy does not find a valid prior response data for the particular URL in its cache then Server Proxy acts as a HTTP client to the HTTP Server and sends a regular HTTP request based on the protocol described in Fielding to HTTP Server. HTTP Server sends the HTTP response data to Server Proxy. On receiving response data from HTTP Server, Server Proxy computes the meta-data for the newly received response data from HTTP Server, using the same algorithm as was used by the Client Proxy, and compares each element of the newly computed meta-data with the corresponding values of meta-data supplied by Client Proxy. If the values for all the corresponding elements of meta-data match, then the Server Proxy informs the Client Proxy to deliver to the HTTP Client the data that is stored in the Client Proxy's cache. The actual response body is not transmitted from the Server Proxy to Client Proxy. Server Proxy stores the response data along with the associated URL and meta-data in its own cache.

Finally, if Server Proxy, on receiving the requested response data either from its own cache or from HTTP Server, computes the meta-data for the newly received response data, and any element of the newly computed meta-data does not match with the corresponding element of the meta-data supplied by the Client Proxy, the cached copy of the response data, stored in Client Proxy's cache, is considered invalid. In this case, Server Proxy sends the newly received response data to the Client Proxy. Client Proxy then sends the response data to HTTP Client. Both Client Proxy and Server Proxy cache the new response data in their respective databases along with the associated URL and meta-data for their future use.

This method may result in a significant reduction in the volume of data transmission from Server Proxy to Client Proxy, and therefore, it may also reduce the time elapsed from the time the request was generated by the HTTP Client and the time the response is delivered to the HTTP Client. It is particularly beneficial when Client Proxy and Server Proxy are connected over a low bandwidth link.

The caching method according to embodiments of the invention coexists with those techniques described in Fielding, but also handles cases the techniques in Fielding may miss. For instance, even data marked as "Cache-Control: private" or "Cache Control: no-cache" (indicating that the data should not be cached) can be safely cached using the MDBC method according to embodiments of the invention. Also, the meta-data can be used to supplement the methods in Fielding as additional or independent metrics for ascertaining whether a cached copy of response data is valid or not.

Furthermore, so long as a suitable meta-data is used, the HTTP Client can achieve a high degree of certainty in receiving the requested data that is correct, and not "stale".

EXAMPLE

As an example, a situation is illustrated here where Client Proxy uses the length of the response data and a computed hash value as two elements of the meta-data (in addition to the URL string itself) associated with a response data for a URL. For each data being requested, HTTP Client sends Client Proxy a request of the following form:
GET <URL> PROTOCOL VERSION
For instance:
GET http://www.w3.org/HTTP/1.1

In a case in which no prior response data is found in Client Proxy cache for the given URL, the Client Proxy simply forwards HTTP Client's request to Server Proxy. Server Proxy first searches its own data cache for the response data for the URL specified by the Client Proxy that is currently valid based on either the Expiration Time Method or Last-Modified Time Method. If such data is found, Proxy Server returns the response data to the Client Proxy. Otherwise, Server Proxy interacts as a regular HTTP client with HTTP Server as described in Fielding and receives the response data from the HTTP Server. Server Proxy sends the response data to Client Proxy. In either case, Client Proxy, in turn, sends the response data to HTTP Client. Both Client Proxy and Server Proxy cache the response data, along with the URL string, length and hash value, in their respective databases for their future use.

In the case where a prior response corresponding to the requested URL is found in Client Proxy's cache, Client Proxy, as part of a modified request, forwards to Server Proxy the request for the URL along with the length and the hash value of the last response data it received for that specific URL.

Server Proxy, upon receiving the request from the Client Proxy, first attempts to fulfill the request from the Client Proxy by examining its own cache. If a prior response data for the particular URL is found in Server Proxy's cache, which is still valid based on either Expiration Time Method or Last-Modified Time Method, then Server Proxy computes the length and hash value for the response data from its cache, using the same algorithm as was used by the Client Proxy, and compares new length and hash value with the length and hash value respectively supplied by Client Proxy. If the length and hash values both match, Server Proxy informs Client Proxy to deliver HTTP Client the response data that is stored in Client Proxy's cache. The actual body of response data is not transmitted from the Server Proxy to Client Proxy. Client Proxy delivers the HTTP response data from the Client Proxy's cache to the HTTP Client.

If, on the other hand, Server Proxy does not find a valid prior response data for the particular URL in its cache then Server Proxy acts as a HTTP client to the HTTP Server and sends a regular HTTP request based on the protocol described in Fielding to HTTP Server. HTTP Server sends the HTTP response data to Server Proxy. On receiving response data from the HTTP Server, Server Proxy computes the length and hash value for the newly received response data from HTTP Server, using the same algorithm as was used by Client Proxy, and compares the newly computed length and hash value with the values of length and hash value respectively, supplied by Client Proxy. If the length and hash value match with the length and hash value supplied by the Client Proxy, then the Server Proxy informs the Client Proxy to deliver to the HTTP Client the data that is stored in the Client Proxy's cache. The actual response body is not transmitted from the Server Proxy to Client Proxy. Server Proxy stores the response data along with the associated URL and meta-data in its own data cache.

Finally, if Server Proxy, on receiving the requested response data either from its own cache or from HTTP Server, computes the length and hash value for the newly received response data, and either newly computed length or hash value does not match with the corresponding length and hash value supplied by the Client Proxy, the cached copy of the response data, stored in Client Proxy's cache, is considered invalid. In this case, Server Proxy sends the newly received response data to the Client Proxy. Client Proxy then sends the response data to HTTP Client. Both Client Proxy and Server Proxy cache the new response data in their respective databases along with the associated URL and meta-data for their future use.

Other embodiments of the MDBC method are possible based on placement of software functionality for HTTP Client, Client Proxy, Server Proxy and HTTP Server components described above. These alternate embodiments are briefly described here.

1. HTTP Client and the Client Proxy can be located on different computers. A single Client Proxy, in this case, can serve one or more HTTP Clients located on different computers.
2. The functionality of the HTTP Client and Client Proxy can be combined in a single software component. For example, a web-browser can implement the combined functionality of HTTP Client and Client Proxy.
3. Server Proxy and HTTP Server may be located on the same computer.
4. The functionality of Server Proxy and Server can be combined into a single software component.
5. The MDBC method is also applicable and can be extended to other name/value-based protocols such as the file transfer protocol (FTP).

It should be recognized that the embodiments described herein and shown in the drawing figures are meant to be illustrative only and should not be taken as limiting the scope of invention. Those skilled in the art will recognize that the elements of the illustrated embodiments can be modified in arrangement and detail without departing from the spirit of the invention. Therefore, the invention as described herein contemplates all such embodiments and modified embodiments as may come within the scope of the following claims or equivalents thereof.

The invention claimed is:

1. A method for optimizing the transmission of data from a server located on a server computer to a client located on a client computer the method comprising steps for:
    a) upon a client request for response data hosted by the server located on a server computer to a client proxy, determining if a prior version of said response data exists in a client proxy cache, if so computing client proxy meta-data from said prior version of said response data to identify said prior version;
    b) if at step a) said prior version of said response data does not exist in said client proxy cache, sending a request for said response data to said server proxy;
    c) upon computing client proxy meta-data in step a), determining if said prior version of said response data is current by comparing said client proxy meta-data with server proxy meta-data computed from the response data requested, if said prior version of said response data is current, informing said client proxy of this, if not then fetching the current response data from said server, returning current response data and computing new server proxy meta-data from said current response data to identify a current server version;
    d) upon receipt of a request from step b), fetching current response data from said server and computing server proxy meta-data from said current response data to identify the current server version;
    e) after fetching the current response data in step d), computing said client proxy meta-data from said current response data to identify a current client version; and
    f) based on the preceding steps, forwarding said prior version of said response data or said current response data from said client proxy to said client located on the client computer.

2. The method of claim 1, wherein the server is an HTTP server having a URL and the meta-data comprises meta-data other than the last-modified time/date and/or the expiration time/date as specified in the response data fetched previously from the HTTP server for the same URL.

3. The method of claim 2, wherein said client proxy meta-data and said server proxy meta-data comprise at least a hash value.

4. The method of claim 1, wherein the client proxy and the server proxy store meta-data indexed or keyed to a requested URL.

5. The method of claim 1, wherein the response data is indicated as uncacheable.

6. The method of claim 5, wherein the response data is indicated as uncacheable by HTTP headers selected from the group of "Cache-Control: private" and "Cache-Control: no-cache".

7. A method for ascertaining the validity of cached response data on a HTTP client located on a computer for a given URL, the method comprising steps for:
    a) receiving at a client proxy, a client request for response data hosted by an HTTP server located on a server computer;
    b) determining if a client proxy version of the response data exists in a client proxy cache;
    c) sending a request comprising client proxy meta-data computed from the client proxy version of the response data to a server proxy if it is determined in step b) that the client proxy version of the response data exists in the client proxy cache;
    d) sending a request to the server proxy for the response data if it is determined at step b) that the client proxy version of the response data does not exist in the client proxy cache;
    e) if a server proxy version of the requested response data is not found, receiving current response data retrieved from the HTTP server at the server proxy and computing server proxy meta-data from the retrieved current response data;
    f) receiving a notification from a processor that the client proxy version of the response data is current when a comparison is made, by the processor, of the client proxy meta-data and the server proxy meta-data, computed from the server proxy version of the response data, and the processor determines that the client proxy version of the response data is current, otherwise, receiving the retrieved current response data from the server proxy at the client proxy;

g) computing client proxy meta-data from the received current response data independently of the server proxy meta-data; and h) forwarding the prior version of the data or the retrieved current response data from the client proxy to the client located on the client computer.

8. The method of claim 7, wherein the meta-data is other than last-modified time/date and/or expiration time/date as specified in the response data fetched previously from the HTTP server for the same URL.

9. The method of claim 8, wherein the client proxy meta-data and the server proxy meta-data comprise at least a hash value.

* * * * *